UNITED STATES PATENT OFFICE.

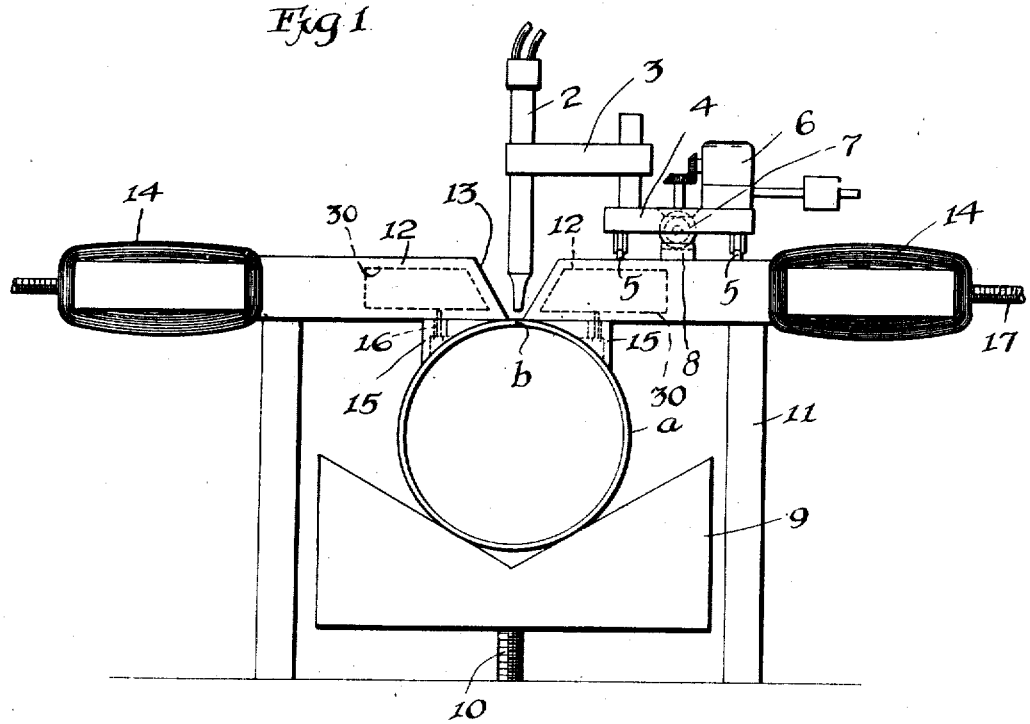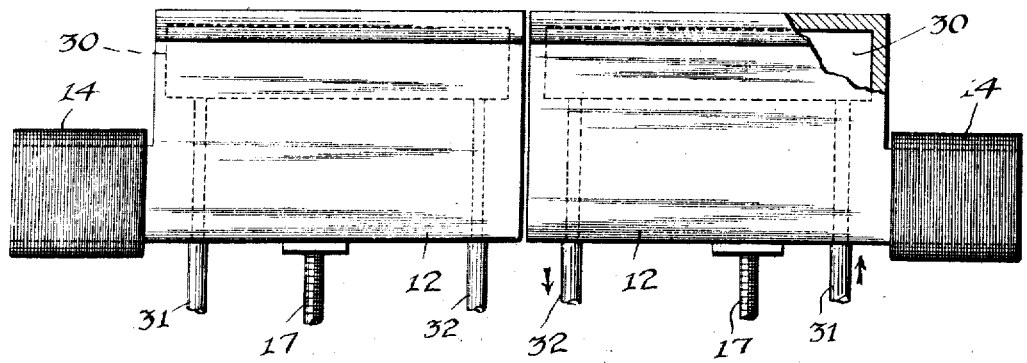

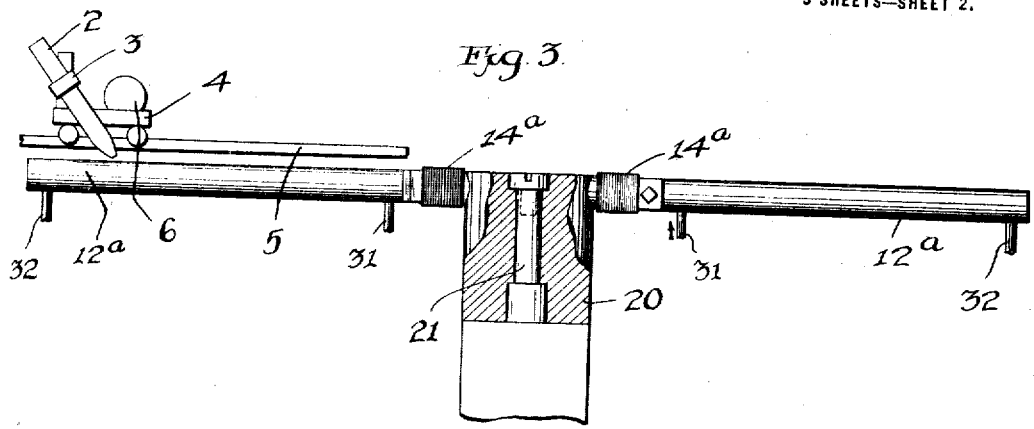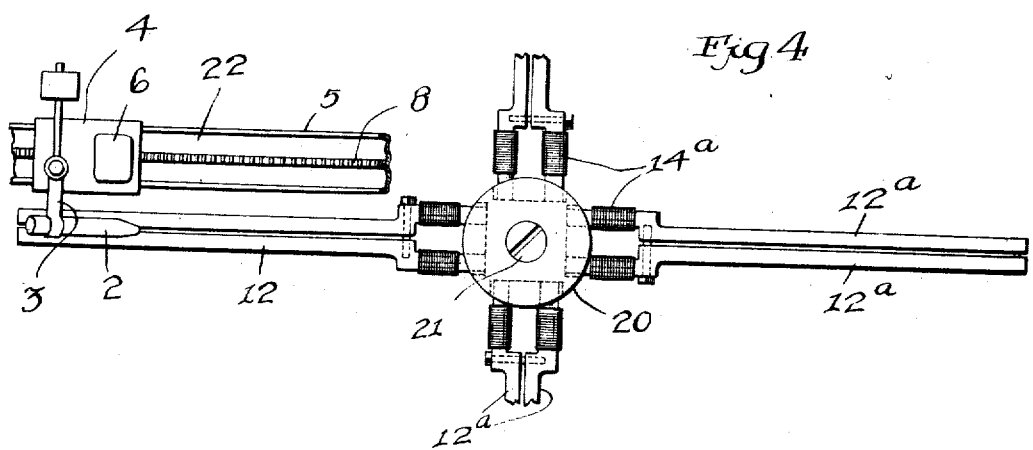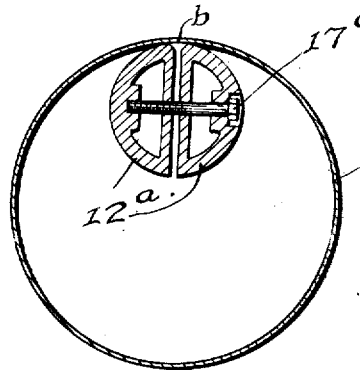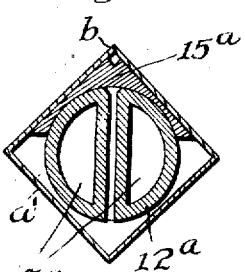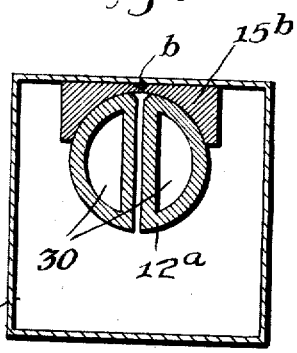

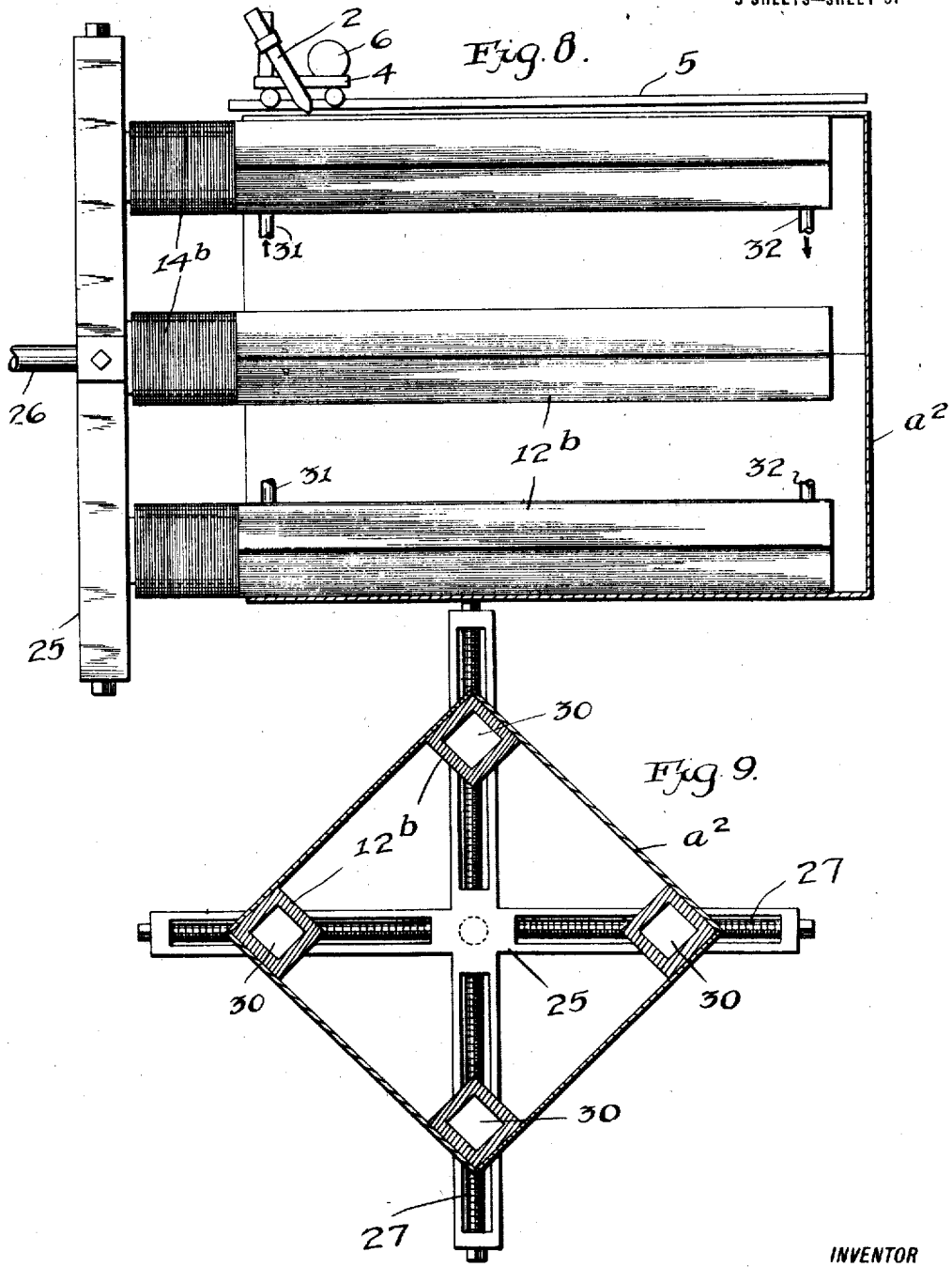

WILLIAM J. BUCKLEY, OF EAST ORANGE, NEW JERSEY, ASSIGNOR TO DAVIS-BOURNONVILLE COMPANY, OF JERSEY CITY, NEW JERSEY, A CORPORATION OF NEW YORK.

WELDING APPARATUS.

1,335,873.   Specification of Letters Patent.   Patented Apr. 6, 1920.

Application filed January 19, 1918, Serial No. 212,557. Renewed February 18, 1920. Serial No. 359,540.

*To all whom it may concern:*

Be it known that I, WILLIAM J. BUCKLEY, a citizen of the United States, and a resident of East Orange, in the county of Essex and State of New Jersey, have invented new and useful Welding Apparatus, of which the following is a specification.

The invention is concerned with the problem of uniting the seams of metal barrel bodies, large diameter tubes, metal boxes and other articles and bodies of sheet metal by the aid of machinery employing as the welding agent an oxy-acetylene or equivalent flame. The welding torch has been employed with great success as a hand implement for repair work and the like, and also in the machine welding of small diameter tubes, which can be propelled and clamped between rolls, but difficulty has been experienced in applying it economically and effectively to machine welding of large bodies and pieces because of the heating effect which causes the lips of the seam ahead of the torch to warp and buckle, thus upsetting the uniformity of conditions upon which machine welding is predicated. Various instrumentalities of a mechanical nature have been devised for holding the edges to be joined in the desired fixed relation, but as the welding proceeds the forces set up in the metal in advance of the flame become so urgent that it is exceedingly difficult by such means to prevent displacement and consequent impairment or failure of the weld. In accordance with this invention the metal at opposite sides of the seam is held magnetically. In this way a powerful and effective holding is secured, and the putting on and taking off of the articles is rendered easier, since instead of opening and closing cumbersome clamps all that is necessary is to manipulate a switch.

In the accompanying drawings a number of applications of the invention are illustrated schematically, and it will be understood that numerous others may be constructed and that I have not endeavored to show the precise details of the electro-magnets and circuit arrangements, leaving these to the mechanics skilled in such matters.

In the said drawings:

Figure 1 is an end view of one embodiment;

Fig. 2 is a plan view of the magnetic holders at one side of the seam;

Fig. 3 is a vertical section through another embodiment;

Fig. 4 is a plan view of the same;

Fig. 5 is an enlarged cross-section of the magnetic support of this form with a cylindrical tubular body to be welded mounted thereon;

Figs. 6 and 7 are cross-sections showing means for adapting this form of support and holder for rectangular or prismatic bodies;

Fig. 8 is a side elevation of another embodiment for use in welding rectangular bodies, a body being shown in section; and Fig. 9 is a cross-section through the same.

Reference will first be had to Figs. 1 and 2. The numeral 2 designates an oxy-acetylene welding torch, which is mechanically supported and driven at a uniform distance from the seam and at a uniform speed, in a straight line, lengthwise thereof. This is preferably accomplished by mounting the torch upon an arm 3 projecting from a wheeled carriage 4, which travels upon suitable tracks 5 and carries an electric motor 6 geared to a worm 7 meshing with a fixed worm rack 8 between the tracks.

The work, which in this instance may be a large diameter tube $a$, is supported in the first instance upon a trough 9, which may be raised and lowered by suitable means 10 in a frame 11. The said frame supports sets or pairs of magnets 12 above and at opposite sides of the seam B to be united. The adjacent edges of these magnets are chamfered, as shown at 13, to admit the working extremity of the torch, and their lower corners are spaced apart sufficiently to expose the seam. The magnets are energized by coils 14, which are supplied with current from a suitable source, not shown, and the circuits of which may be opened and closed by conveniently located switches. The under portions of the magnets may be shaped to conform to the upper arc of the body $a$, but, in order that the machine may be used with bodies of different diameters, it is preferable to employ separate adapters 15, which may be screwed or otherwise removably and adjustably secured to the magnets, as indicated, for example, at 16. Either or both of the magnets may be adjusted transversely of the seam by means of screws or the like 17.

In operation, the current being off the coils 14 and the magnets, therefore, deënergized, a body such as $a$ is placed upon the trough or temporary support 9 and raised up close beneath the magnets, in which position it is turned if necessary in order to dispose its seam in a substantially central position. Current is now turned on to the coils, and, by the magnetic attraction which results, the top of the tube is clamped upward against the magnets or against the interposed adapters 15, which may constitute in effect parts of the magnets. Final adjustment of the seam edges may be secured by slightly shifting the magnets in transverse directions. The torch flame may now be lighted and the torch caused to progress lengthwise over the seam, the edges of which are held against all movement by the magnets. Needless to say, numerous changes and refinements may be introduced in practice. For example, I have indicated two magnets at a side, but instead there may be any desired number and the proportions, number and arrangement of the coils and pole portions may be varied, as may be deemed most expedient.

In Figs. 3 to 5 the magnets $12^a$ are constituted as arms on which to hang barrel bodies or the like $a'$. Each arm preferably comprises two longitudinal halves bearing energizing coils $14^a$ at their inner ends, and a number of these arms may be mounted in a suitable manner and in radiating relation upon a turret or post 20, which is revoluble about a vertical axis 21, in order to bring the arms successively into operative relation to the torch mechanism. The torch 2 is mounted upon a carriage 4 similar to that previously illustrated. In this instance, however, the carriage runs and drives upon a rail or trolley 22, which is supported in a fixed position by means, not shown, and bears the tracks 5 and the rack 8. One or both of the magnetic members of each arm are preferably transversely adjustable, as indicated, by screws $17^a$. Figs. 6 and 7 indicate how this form of machine may be used for welding prismatic bodies by placing suitable saddles or adapters $15^a$, $15^b$, preferably of magnetic material, upon the arms.

Figs. 8 and 9 illustrate another construction for welding rectangular or prismatic bodies. Four magnet bars $12^b$ bearing suitable energizing coils $14^b$ are supported in horizontally projecting relation from a frame 25, their arrangement being that of a hollow square or rectangular. A body $a^2$ having a longitudinal seam to be welded may be slipped over these arms, or a rectangular tube or body may be built up by placing two sheets upon the bars and welding their adjacent edges, then applying another plate and welding it, and similarly with the fourth. The support 25 may be mounted to rotate about the horizontal axis 26, and the magnets are adjustable toward and from the center to accommodate bodies of different dimensions by means of screws 27 or otherwise.

A feature of the invention not previously referred to is the cooling of the magnets. This is necessary in order that the heating may not destroy the magnetism. For this purpose the iron bodies of the magnets are to be constructed with interior spaces or channels 30, through which cooling water or other fluid is circulated, inlet and outlet pipes 31 and 32 being indicated as representative of a suitable circulatory system.

What I claim as new is:

1. In apparatus for welding sheet metal, the combination of a mechanically supported welding torch, electro-magnetic means for holding the sheet metal work with its edges in fixed relation, and driving mechanism for producing relative movement between the torch and electro-magnetic means in the direction of the seam.

2. In apparatus for welding sheet metal, the combination of a mechanically supported welding torch, electro-magnetic means for holding the sheet metal work with its edges in fixed relation, means for cooling the magnetic holder, and driving mechanism for producing relative movement between the torch and electro-magnetic means in the direction of the seam.

3. In apparatus of the character described, the combination of a mechanically supported welding torch, electro-magnetic means adapted to hold a hollow body with its straight edges to be united in fixed relation, and driving mechanism for producing relative movement between the torch and electro-magnetic means in the direction of the seam.

4. In apparatus of the character described, the combination of a mechanically supported welding torch, electro-magnetic members adapted to hold a body or pieces with straight edges to be united in fixed relation, means for moving said members toward or from each other, and mechanism for producing relative drive between the torch and electro-magnetic members.

WILLIAM J. BUCKLEY.